(12) United States Patent
Yukizane et al.

(10) Patent No.: US 7,737,574 B2
(45) Date of Patent: Jun. 15, 2010

(54) TERMINATING DEVICE FOR INSTALLATION AT A TERMINATION OF A POWER LINE USABLE FOR POWER LINE COMMUNICATION

(75) Inventors: Ryota Yukizane, Fukuoka (JP); Mutsuhiko Ooishi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 221 days.

(21) Appl. No.: 12/110,143

(22) Filed: Apr. 25, 2008

(65) Prior Publication Data

US 2008/0291005 A1  Nov. 27, 2008

Related U.S. Application Data

(63) Continuation of application No. PCT/JP2006/321045, filed on Oct. 23, 2006.

(30) Foreign Application Priority Data

Oct. 26, 2005  (JP) .............................. 2005-311402

(51) Int. Cl.
*H02J 3/02* (2006.01)
(52) U.S. Cl. .......................................................... 307/3
(58) Field of Classification Search ...................... 307/3
See application file for complete search history.

(56) References Cited

U.S. PATENT DOCUMENTS

| 5,748,910 | A | 5/1998 | Herrera |
| 2003/0169157 | A1 | 9/2003 | Yokoo |
| 2006/0214507 | A1 | 9/2006 | Suzuki |

FOREIGN PATENT DOCUMENTS

| JP | 4-299721 | 10/1992 |
| JP | 9-223108 | 8/1997 |
| JP | 2003-258690 | 9/2003 |
| JP | 2003-264486 | 9/2003 |
| JP | 2003-283387 | 10/2003 |
| JP | 2003-283390 | 10/2003 |
| JP | 2004-56766 | 2/2004 |
| JP | 2004-304365 | 10/2004 |
| JP | 2006-260851 | 9/2006 |

OTHER PUBLICATIONS

International Search Report dated Jan. 23, 2007 w/ English translation.

*Primary Examiner*—Robert L. Deberadinis
(74) *Attorney, Agent, or Firm*—Dickinson Wright PLLC

(57) ABSTRACT

A terminating device enables power line communication to be performed while suppressing degradation of the communication quality without decreasing the communication efficiency. The terminating device includes power supply plugs, a terminating circuit, a changeover switch, and power jack terminals, which are housed in an adapter case. The terminating circuit has an impedance corresponding to the impedance between power lines in the used frequency band of power line communication and is connected or disconnected between the power supply plugs by the changeover switch.

19 Claims, 14 Drawing Sheets

FIG. 7A
FIG. 7B
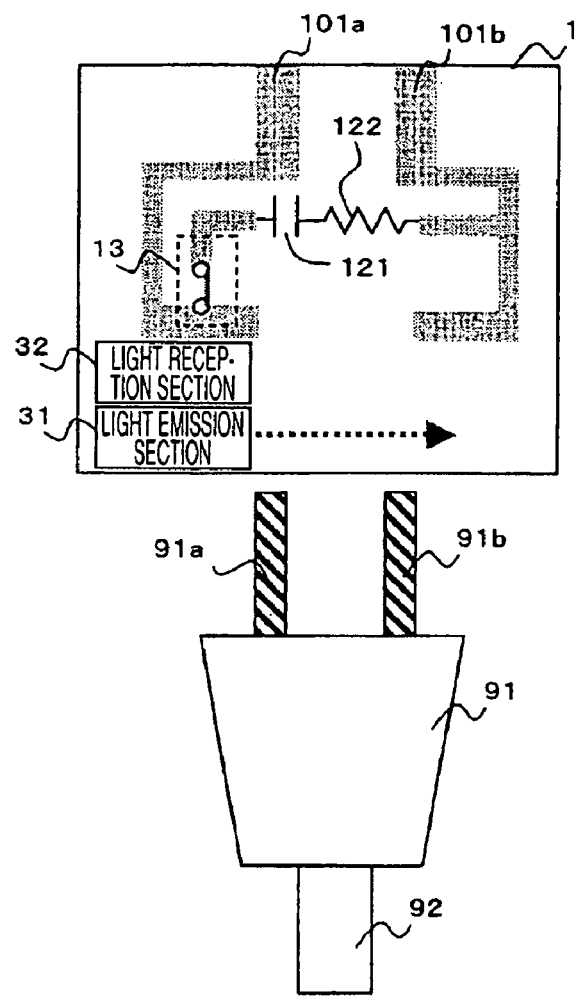
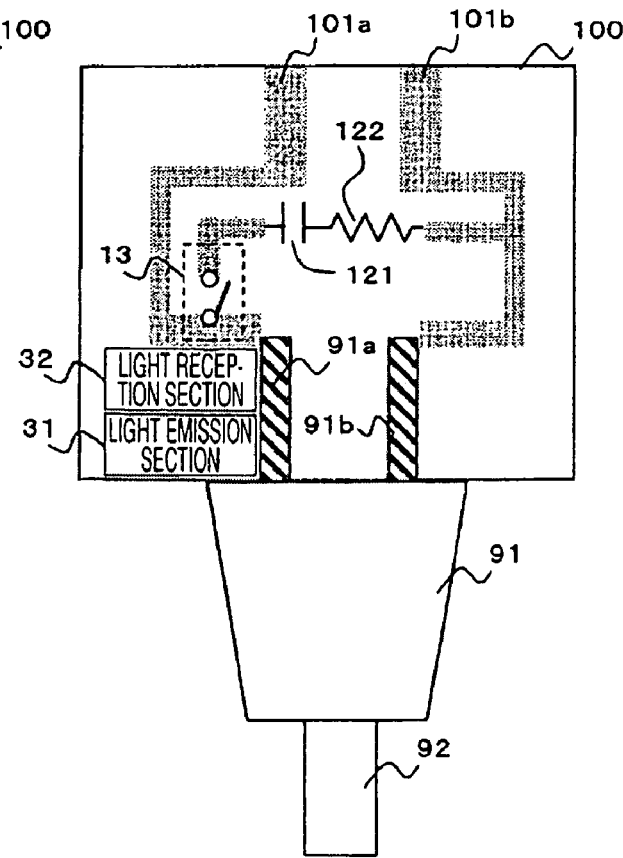

FIG. 8A
FIG. 8B
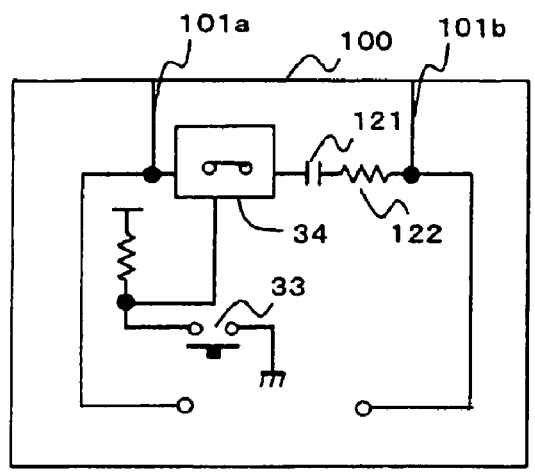
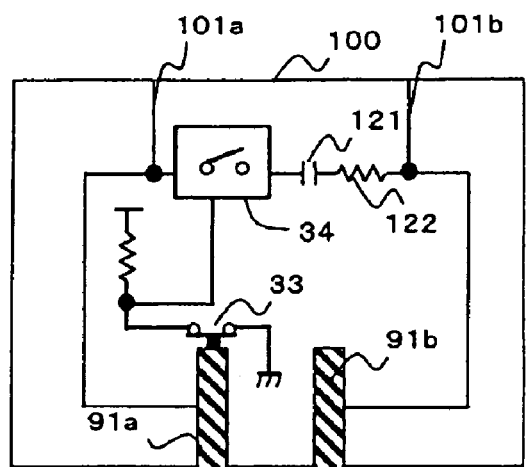
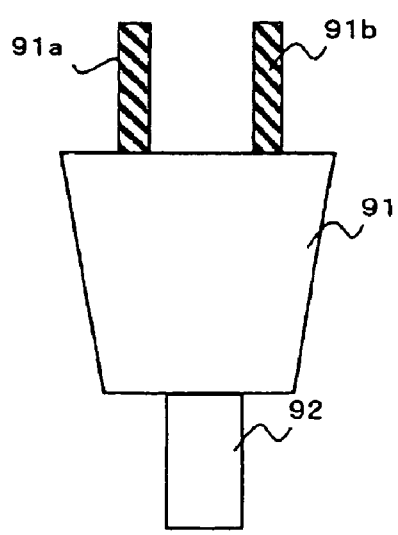
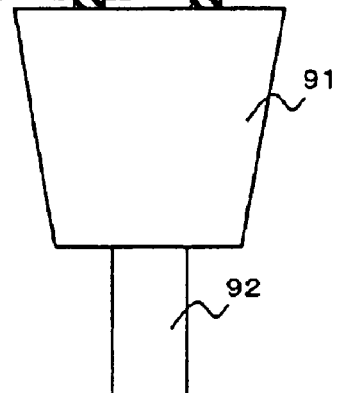

TERMINATING DEVICE FOR INSTALLATION AT A TERMINATION OF A POWER LINE USABLE FOR POWER LINE COMMUNICATION

FIELD OF THE INVENTION

This invention relates to a terminating device for being installed at the termination of an indoor power line used for power line communication.

BACKGROUND OF THE RELATED ART

Power line communication, also known as Broadband over Power Lines (BPL), is communications using a power line such as electric wires for supplying commercial power as a transmission line and is generally performed as balanced transmission using parallel electric wires. In indoor power line communication, each communication apparatus is connected through a modem to an electric outlet to which two or three electric wires are connected. Both transmission and reception are executed between the communication apparatus connected to the electric outlet.

Since the indoor power line is not essentially laid as the transmission line, the power line is not suitable to communications in some cases. For example, if an electric apparatus is not connected to an electric outlet, the electric wires are in a state of a so-called open stub at the electric outlet and the communication quality is adversely affected. That is, because the electric outlet becomes an open end (high impedance), the input impedance characteristic of the power line to which a predetermined load is connected becomes unstable relative to the frequency. Consequently, reflection of a high frequency signal occurs, and thus a communication signal is degraded.

In a state in which a power plug of an electric apparatus is connected to an electric outlet, the input impedance of the electric apparatus is small in a high frequency and the electric wires are in a state of a so-called short stub state at the electric outlet. Consequently, reflection of a high frequency signal occurs in the portion of the electric outlet, and the communication quality deteriorates.

US2006/0214507 A1 describes terminating devices that are for being connected to an electrical outlet of an indoor power line and that have a plug for enabling an electric apparatus to be connected thereto. However, if an electric apparatus for power line communication (a modem, etc.) is connected to the terminating device, a communication signal of power line communication is absorbed in the terminating device and the communication efficiency is reduced. If a modem, etc., is connected to the electrical outlet adjoining (or close to) the electrical outlet to which the terminating device is connected, absorption of a communication signal also occurs, and a decrease in the communication efficiency cannot be avoided.

It is therefore an object of the invention to provide a terminating device for making it possible to conduct power line communication with suppression of the degradation of the communication quality without decreasing the communication efficiency.

SUMMARY

To address the above-described problems, a terminating device is installed at the termination of an indoor power line used for power line communication, which makes it possible to conduct power line communication with suppression of degradation of the communication quality without decreasing the communication efficiency.

A terminating device is installed at a termination of a power line usable for power line communication. The terminating device includes first and second terminals, a terminating circuit and a switch. The first and second terminals are capable of being connected to the power line. The terminating circuit has a predetermined impedance and is connected to the first terminal. The switch is connected to the second terminal in series with the first terminal, the terminating circuit and the second terminal and switches connection between the first and second terminals.

BRIEF DESCRIPTION OF THE DRAWINGS

The accompanying drawings, which are incorporated in and constitute a part of the specification, illustrate presently preferred non-limiting examples of exemplary embodiments of the invention, and, together with the general description given above and the detailed description of the preferred embodiments given below, serve to explain the principles and concepts of the invention, in which like reference characters designate like or corresponding parts throughout the several drawings. Preferred embodiments of the present invention will now be further described in the following paragraphs of the specification and may be better understood when read in conjunction with the attached drawings, in which:

FIG. 7A illustrates the operation of another example of the switch in the terminating device of the first embodiment.

FIG. 7B illustrates the operation of another example of the switch in the terminating device of the first embodiment.

FIG. 8A illustrates the operation of another example of the switch in the terminating device of the first embodiment.

FIG. 8B illustrates the operation of another example of the switch in the terminating device of the first embodiment

DETAILED DESCRIPTION

Reference will now be made in detail to the presently non-limiting, exemplary and preferred embodiments of the invention as illustrated in the accompanying drawings. The nature, concepts, objectives and advantages of the present invention will become more apparent to those skilled in the art after considering the following detailed description in connection with the accompanying drawings. The following description is provided in order to explain preferred embodiments of the present invention, with the particular features and details shown therein being by way of non-limiting illustrative examples of various embodiments of the present invention. The particular features and details are presented with the goal of providing what is believed to be the most useful and readily understood description of the principles and conceptual versions of the present invention. In this regard, no attempt is made to show structural details of the invention in more detail than is necessary for the fundamental understanding of the present invention. The detailed description considered with the appended drawings are intended to make apparent to those skilled in the art how the several forms of the present invention may be embodied in practice.

First Embodiment

Figure 1:
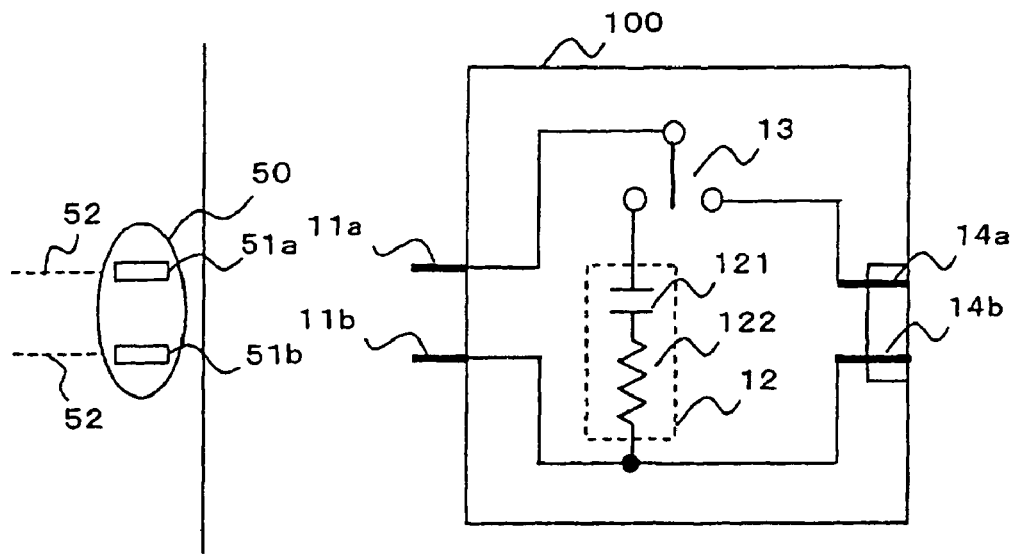
FIG. 1 shows the schematic configuration of an example of a terminating device of a first embodiment.

Referring to FIG. 1, a terminating device is used as an adapter that can be attached to and detached from an electric outlet corresponding to the termination of an indoor power line. The terminating device includes plug terminals 11a and 11b, a terminating circuit 12, a changeover switch 13, and power jack terminals 14a and 14b, and is housed in an adapter case 100 schematically shown. A power line has a pair of electric wires such as VVF cable, etc., for example, and is laid indoors in a residence (for example, a condominium or a detached house), an office, a factory, etc.

The plug terminals 11a and 11b are inserted into power jacks 51a and 51b of an electric outlet 50 respectively. The power jacks 51a and 51b are respectively connected to one of power lines 52 (indoor power line). The terminating circuit 12 is connected to the plug terminal 11b. The changeover switch 13 is connected to the plug terminal 11a in series with the plug terminal 11a, the terminating circuit 12 and the plug terminal 11b. That is, the terminating circuit 12 is connected, through the changeover switch 13, to the plug terminal 11a.

The changeover switch 13 is a switch identified as SPDT (single pole, double throw) or SPCO (single pole changeover) such as a toggle switch, a membrane switch and a MOSFET, etc. The changeover switch 13 switches connection between the plug terminals 11a and 11b. That is, the changeover switch 13 opens or closes connection between the plug terminal 11a and the terminating circuit 12. The power jack terminals 14a and 14b are power supply terminals for supplying power to the outside, particularly to power plugs of a communication apparatus for performing power line communication and various electric apparatuses other than a communication apparatus.

The frequency band used for power line communication is MF: Medium frequency (300 k to 3 MHz), HF: High frequency (3M to 30M Hz) and VHF: Very High frequency (30M to 300M Hz). In this embodiment, the used frequency band is 1.795 to 30 MHz, but the maximum of the used frequency band may be expanded into 80 MHz.

While the changeover switch 13 opens connection between the plug terminal 11a and the terminating circuit 12, the changeover switch 13 closes connection between the plug terminals 11a, 11b and the power jack terminals 14a, 14b. When the changeover switch 13 closes the connection between the plug terminal 11a and the terminating circuit 12, the changeover switch 13 opens the connection between the plug terminals 11a, 11b and the power jack terminals 14a, 14b. Hereinafter, the term "communication apparatus" refers to a communication apparatus performing power line communication. Also, the term "electric apparatus" refers to various electric apparatuses other than a communication apparatus.

The terminating circuit 12 has predetermined impedance corresponding to the impedance between indoor power lines in the used frequency band of power line communication. A range of the predetermined impedance (absolute value) is tens to 1 k ohms, but 50 to 150 ohms is preferable. The terminating circuit 12 has a series circuit of an electrostatic capacitative element 121 and a resistance element 122. That is, the terminating circuit 12 has the electrostatic capacitative element 121 and the resistance element 122 as circuit elements. Any circuit elements can be selected within the above-mentioned range. Therefore, the indoor power line is terminated in the terminating circuit 12 in a state in which the plug terminals 11a and 11b are inserted into the power jacks 51a and 51b of the electric outlet 50 and the terminating circuit 12 is connected between the plug terminals 11a and 11b. Accordingly, the input impedance characteristic of the power line to which a predetermined load is connected (which will be hereinafter referred to simply as "input impedance") can be stabilized relative to the frequency, so that reflection of a high frequency signal used for power line communication can be decreased.

The terminating circuit 12 is not limited to the series circuit of the electrostatic capacitative element 121 and the resistance element 122 as shown in FIG. 1 and may be any circuit that has the predetermined impedance. The impedance of the terminating circuit 12 need not be fixed and may be changeable.

Figure 2A:
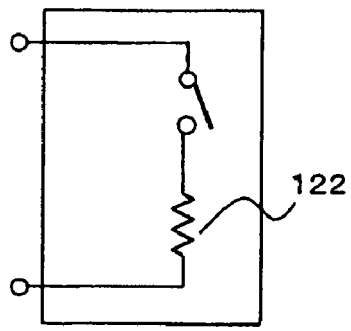
FIG. 2A shows the configuration of a terminating circuit using resistance element, of the first embodiment.
Figure 2B:
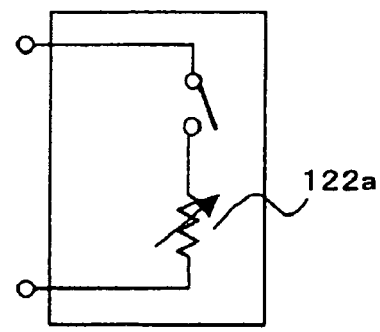
FIG. 2B shows the configuration of a terminating circuit using variable resistance element, of the first embodiment.
Figure 2C:
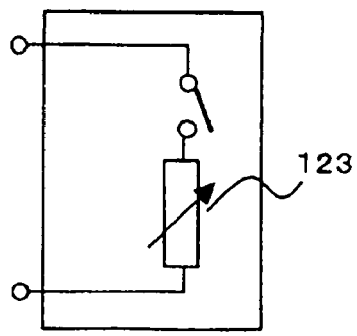
FIG. 2C shows the configuration of a terminating circuit using variable impedance element 123, of the first embodiment.

Referring to FIG. 2A, the terminating circuit 12 has one resistance element 122. Referring to FIG. 2B, the terminating circuit 12 has one variable resistance element 122a. Referring to FIG. 2C, the terminating circuit 12 has one variable impedance element 123. The resistance value of the variable resistance element 122a and the impedance of the variable impedance element 123 may be manually changeable or may be electrically changeable.

Figure 2D:
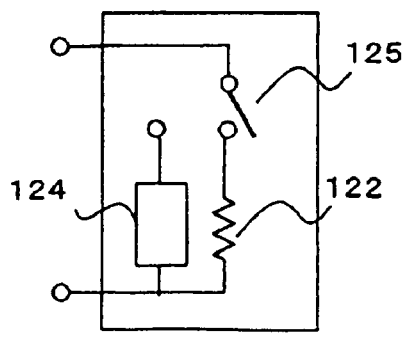
FIG. 2D shows the configuration of a terminating circuit using the parallel series circuit of the electrostatic capacitative element and the resistance element, of the first embodiment.

Referring to FIG. 2D, either of one resistance element 122 and one impedance element 124 is selected by a termination impedance switch 125. The termination impedance switch 125 may be manually switched by a toggle switch and a membrane switch or may be automatically switched, by appropriate drive means such as a MOSFET and a relay, in response to the use state. The termination impedance switch 125 may be used as the changeover switch 13.

In the terminating circuit in FIG. 1, when the terminating circuit 12 connects between the plug terminals 11a and 11b, the plug terminal 11a and the power jack terminal 14a are disconnected. But the terminating circuit 12 may be disconnected from both the plug terminal 11a and the power jack terminal 14a without the plug terminal 11a being disconnected from the power jack terminal 14a. In this condition, if a communication apparatus is connected to the power jack terminal 14a, the changeover switch 13 is operated so as to disconnect the terminating circuit 12 from the plug terminals 11a, 11b.

FIG. 1 shows the terminating device applied to an adapter attached to and detached from the electric outlet 50, but it may alternatively be applied to the electric outlet 50. In this case, the terminating circuit 12 and the changeover switch 13 are connected to a feeding conductor (power line) 52 of the electric outlet 50 in a similar configuration to that shown in FIG. 11.

Figure 3:
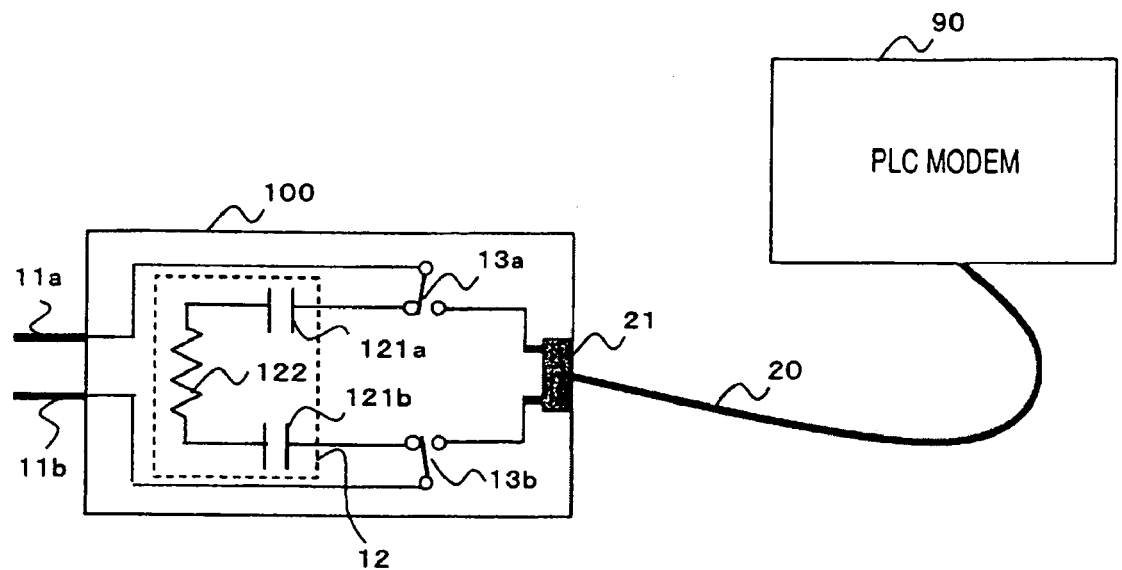
FIG. 3 shows the schematic configuration of another example of the terminating device of the first embodiment.

The terminating device of the first embodiment can also be configured as an adapter connected to a power cable of a communication apparatus. Referring to FIG. 3, the terminating device includes plug terminals 11a and 11b, a terminating circuit 12, switches 13a and 13b, and a power cable connection section (power supply terminal) 21, and is housed in an adapter case 100 schematically shown. The power cable connection section 21 is an electrical outlet having the power jack terminals 14a and 14b.

Referring to FIG. 3, the plug terminals 11a and 11b are respectively inserted into the power jacks 51a and 51b of the electric outlet 50 shown in FIG. 1. The power jacks 51a and 51b are respectively connected to one of power lines 52 (indoor power wiring). The terminating circuit 12 includes a series circuit of two capacitative elements 121a and 121b and a resistance element 112. The switches 13a, 13b switch connection between the plug terminals 11a, 11b and the terminating circuit 12. A power cable 20 of a power line communication modem 90 (which will be hereinafter described as PLC modem), which is a kind of communication device, is connected to the power cable connection section 21 and is connected to the plug terminals 11a, 11b through the changeover switches 13a, 13b.

To connect the terminating device to the electrical outlet 50 (see FIG. 1) and operate the PLC modem, the switches 13a and 13b are switched to the power cable connection section 21 side and the PLC modem and the power lines 52 (see FIG. 1) are electrically connected through the plug terminals 11a and 11b, the switches 13a and 13b, the power cable connection section 21, and the power cable 20.

As the terminating circuit 12, not only that shown in FIG. 3, but also any circuit containing those elements shown in FIGS. 2A, 2B, 2C and 2D can be adopted. The configuration of the changeover switches 13a, 13b can be appropriately changed to one having predetermined impedance as in the terminating device in FIG. 1. The communication apparatus can include not only a communication apparatus single unit such as a modem, but also an electric apparatus with a built-in modem.

The specific configuration and the switching operation of the switch will be discussed with reference to FIGS. 4A to 8. FIGS. 4A to 8 describe the operation when a power plug 91 connected to a power cable 92 of a communication device, etc., is connected to power jack terminals 14a and 14b of a terminating device as shown in FIG. 1 or jack terminals of an electrical outlet incorporating a terminating device. In FIGS. 4A to 8, power supply conductors 101a and 101b denote conductors connected to plug terminals 11a and 11b of a terminating device as shown in FIG. 1 or feeding conductors of an electrical outlet. Since FIGS. 4A to 8 are drawings to describe the switching operation, the configuration of the power jack is shown schematically or is omitted.

Figure 4A:
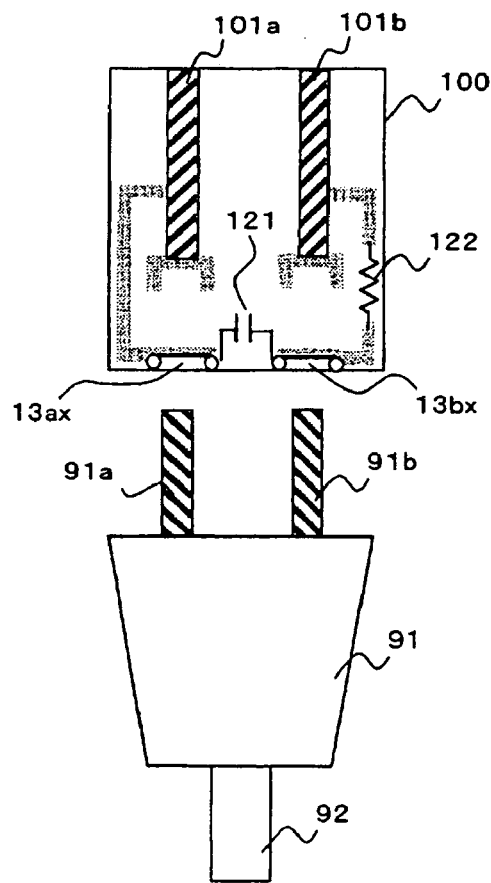
FIG. 4A illustrates the operation of an example of the switch in the terminating device of the first embodiment.
Figure 4B:
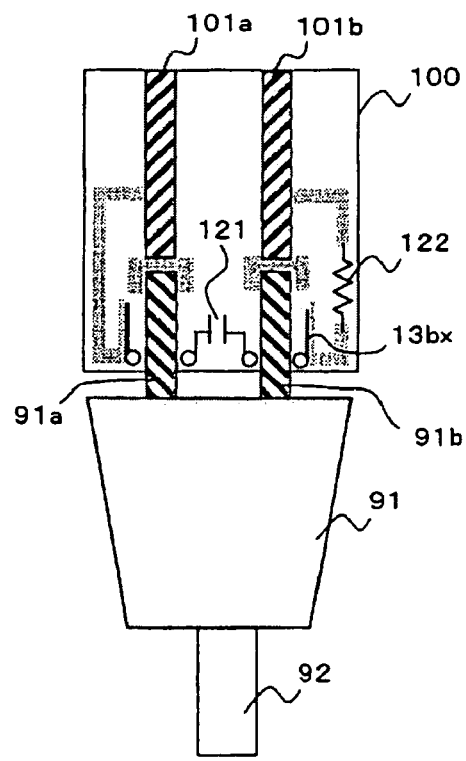
FIG. 4B illustrates the operation of an example of the switch in the terminating device of the first embodiment.

Referring to FIGS. 4A and 4B, the terminating device is provided with moving conductors 13ax and 13bx of the switches in insertion slots of plug terminals 91a and 91b.

Referring to FIG. 4A, the moving conductors 13ax, 13bx can rotate with one end as a supporting point. Before the plug terminals 91a and 91b are inserted, an electrostatic capacitative element 121 and a resistance element 122 making up the terminating circuit are connected to the power supply conductors 101a and 101b. Referring to FIG. 4B, when the plug terminals 91a and 91b are inserted, the moving conductors 13ax and 13bx rotate, disconnecting the electrostatic capacitative element 121 and the resistance element from the power supply conductors 101a and 101b.

Referring to FIG. 5, the terminating device is of a similar structure to that in FIGS. 4A and 4B except that moving conductors 13ax and 13bx of the switches can rotate with the center as a supporting point, and when the plug terminals 91a and 91b are inserted, the plug terminals 91a and 91b and power supply conductors 101a and 101b are connected through the moving conductors 13ax and 13bx.

Figures 5A, 5B:
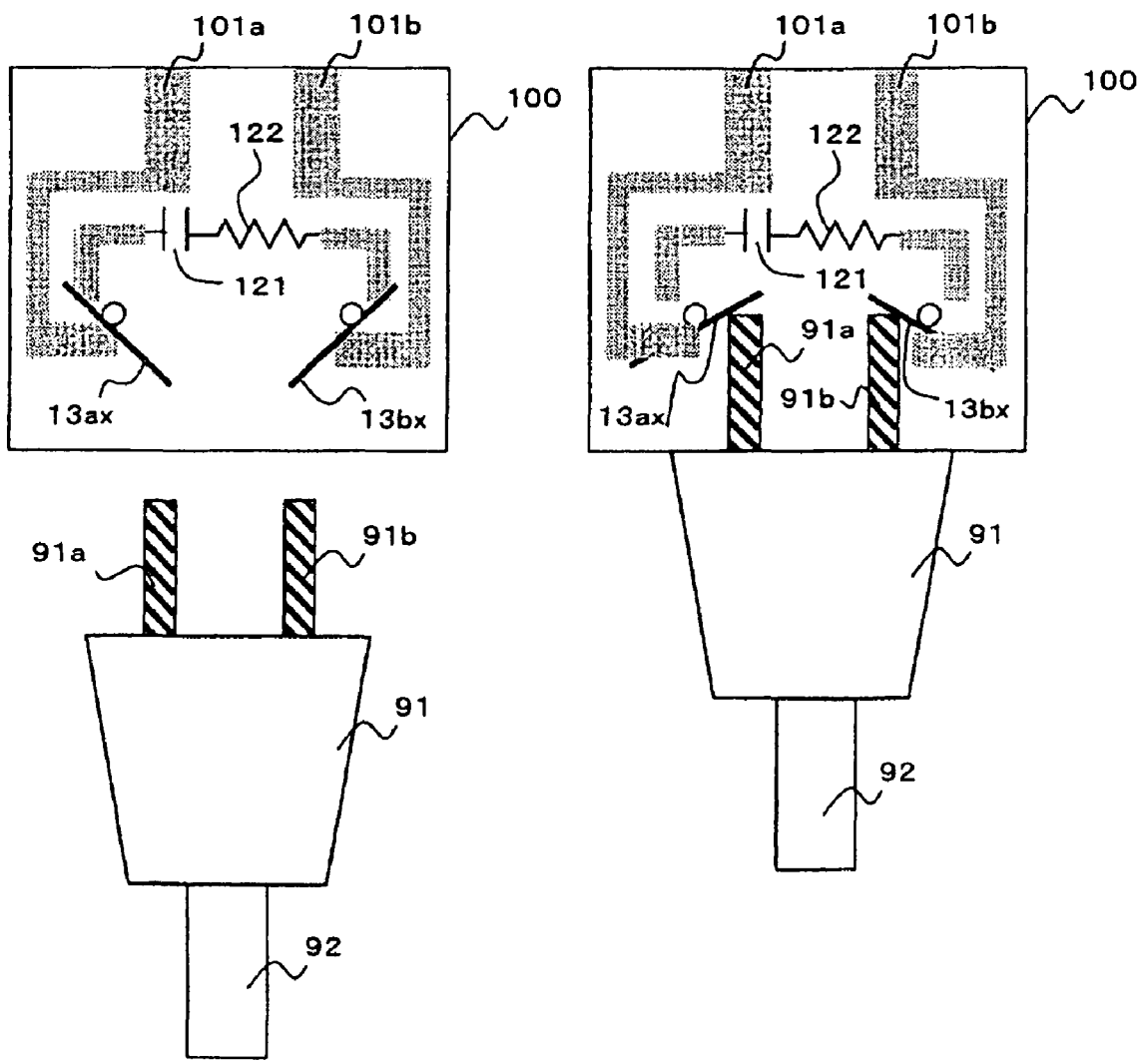
FIG. 5 illustrates the operation of an example of the switch in the terminating device of the first embodiment.

Referring to FIG. 5A, before the plug terminals 91a and 91b are inserted, an electrostatic capacitative element 121 and a resistance element 122 making up the terminating circuit are connected to the power supply conductors 101a and 101b. Referring to FIG. 5B, when the plug terminals 91a and 91b are inserted, the moving conductors 13ax and 13bx rotate, disconnecting the electrostatic capacitative element 121 and the resistance element from the power supply conductors 101a and 101b, and the plug terminals 91a and 91b and the power supply conductors 101a and 101b are connected.

Figure 6A:
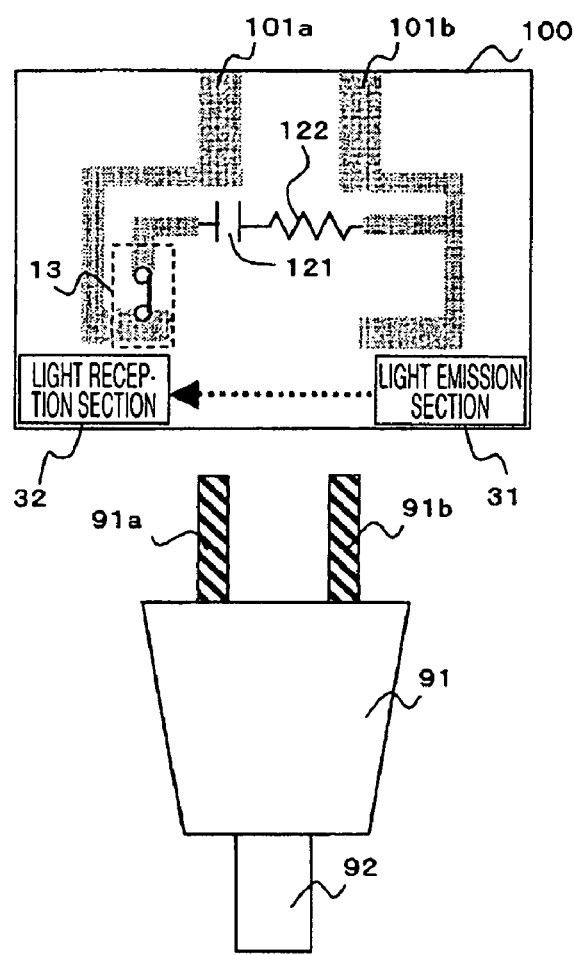
FIG. 6 illustrates the operation of another example of the switch in the terminating device of the first embodiment.
Figure 6B:
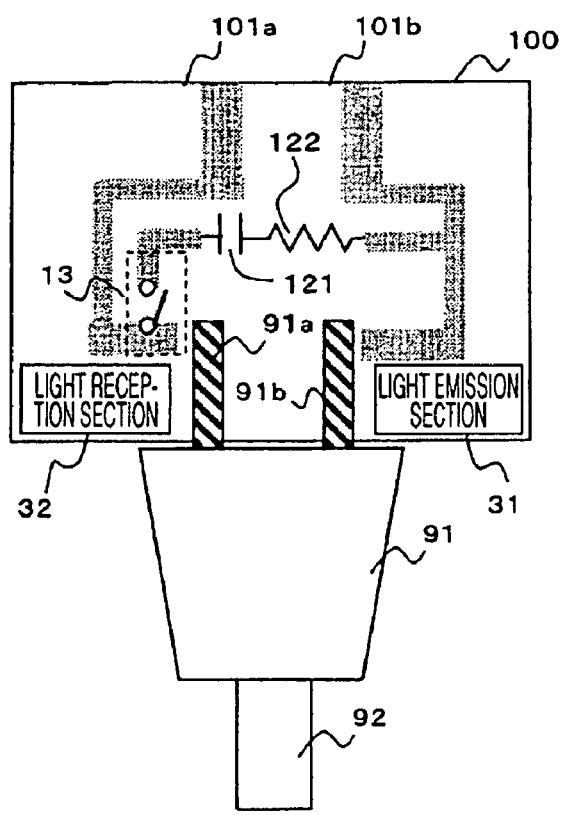

Referring to FIGS. 6A and 6B, in the terminating device, a light emission section 31 and a light reception section 32 are placed so as to sandwich inserted plug terminals 91a and 91b in the proximity of insertion slots of the plug terminals 91a and 91b, and a changeover switch 13 operating in response to the state of the light reception section 32 is provided between an electrostatic capacitative element 121 and a resistance element 122 making up the terminating circuit and power supply conductors 101a and 101b. The light emission section 31 may be, for example, a light emitting diode, etc., and the light reception section 32 may be for example, a silicon diode, a photo transistor, etc.

Referring to FIG. 6A, before the plug terminals 91a and 91b are inserted, light from the light emission section 31 is incident on the light reception section 32 and thus an electrostatic capacitative element 121 and a resistance element 122 are connected to the power supply conductors 101a and 101b. Referring to FIG. 6B, when the plug terminals 91a and 91b are inserted, the light from the light emission section 31 is blocked, and thus no light is incident on the light reception section 32. Consequently, the changeover switch 13 is turned off, disconnecting the electrostatic capacitative element 121 and the resistance element 122 from the power supply conductors 101a and 101b.

Referring to FIGS. 7A and 7B, the terminating device has a similar structure to that in FIGS. 6A and 6B except that a light emission section 31 and a light reception section 32 are placed on one side in the proximity of insertion slots of the plug terminals 91a and 91b.

Referring to FIG. 7A, before the plug terminals 91a and 91b are inserted, light from the light emission section 31 is not incident on the light reception section 32. At this time, a setting is made so that the changeover switch 13 is turned on unlike that in FIG. 6, and an electrostatic capacitative element 121 and a resistance element 122 are connected to power supply conductors 101a and 101b.

Referring to FIG. 7B, when the plug terminals 91a and 91b are inserted, the light from the light emission section 31 is reflected on the plug terminal 91a and is incident on the light reception section 32, and thus the changeover switch 13 is turned off, disconnecting the electrostatic capacitative element 121 and the resistance element 122 from the power supply conductors 101a and 101b.

Referring to FIGS. 8A and 8B in the terminating device, a push switch 33 pushed by the inserted plug terminal 91a (or 91b) is placed in the proximity of insertion slots of the plug terminals 91a and 91b, and a relay 34 controlled in response to the state of the push switch 33 is provided between an electrostatic capacitative element 121 and a resistance element 122 making up the terminating circuit and power supply conductors 101a and 101b.

Referring to FIG. 8A, before the plug terminals 91a and 91b are inserted, the push switch 33 is off and the relay 34 is on, connecting the electrostatic capacitative element 121 and the resistance element 122 to the power supply conductors 101a and 101b.

Referring to FIG. 8B, when the plug terminals 91a and 91b are inserted, the push switch 33 is turned on and thus the relay 34 is turned off, disconnecting the electrostatic capacitative element 121 and the resistance element 122 from the power supply conductors 101a and 101b.

In this embodiment, the changeover switch may switch the connection in accordance with the operation status of the communication apparatus. The operation status includes power ON/OFF and operation mode such as stand-by (sleep mode) or active mode (power ON).

Second Embodiment

Figure 9:
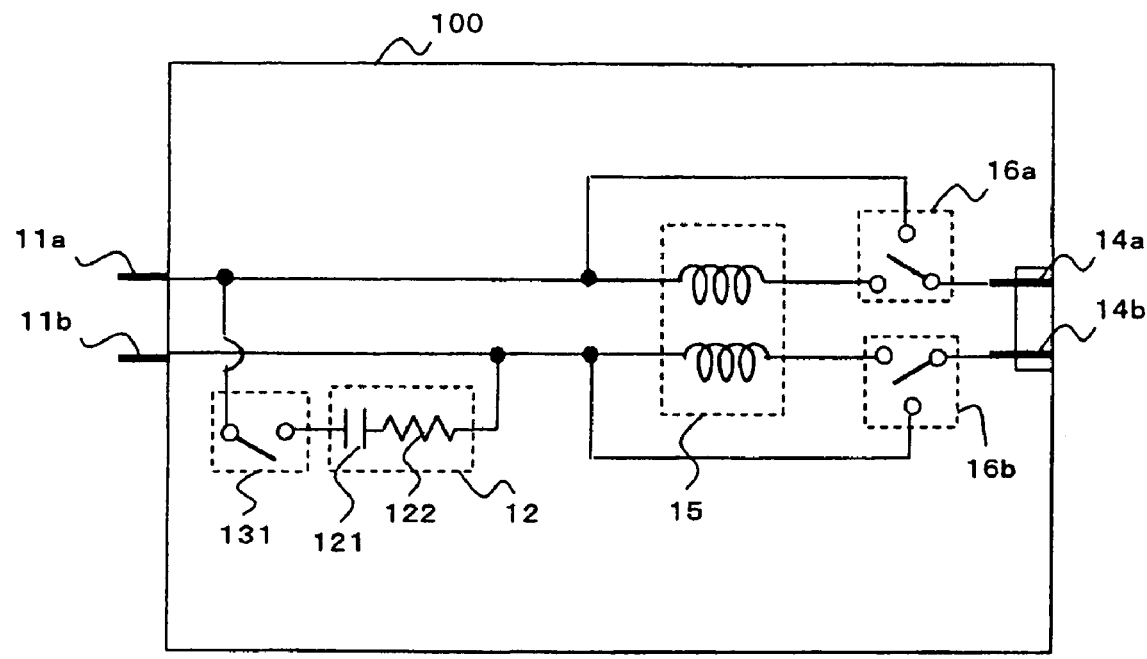
FIG. 9 shows a schematic configuration of an example of a terminating device of a second embodiment.

Referring to FIG. 9, the terminating device is used as an adapter that can be attached to and detached from an electric outlet of an indoor power line like the terminating device in FIG. 1. The terminating device includes plug terminals 11a and 11b, a terminating circuit 12, a changeover switch 131, power jack terminals 14a and 14b, an impedance section 15, and short-circuit switches 16a and 16b, and is housed in an adapter case 100 schematically shown.

The plug terminals 11a and 11b are inserted into power jacks 51a and 51b of an electric outlet 50 shown in FIG. 1. The power jacks 51a and 51b are respectively connected to one of power lines 52. The terminating circuit 12 connects, through the changeover switch 131, the plug terminal 11a to and the plug terminal 11b.

The changeover switch 131 switches connection between the plug terminal 11a and the terminating circuit 12. The power jack terminals 14a and 14b are provided for supplying power to the outside and transmitting a signal to power plugs of a communication apparatus and various electric apparatuses.

The terminating circuit 12 has impedance corresponding to the impedance between indoor power lines in the used frequency band of power line communication. The terminating circuit 12 has a series circuit of an electrostatic capacitative element 121 and a resistance element 122. Therefore, the indoor power line is terminated in the electrical outlet in a state in which the terminating circuit 12 connects the plug terminal 11a to the plug terminal 11b. Consequently, reflection of a high frequency signal used for power line communication can be decreased.

As the terminating circuit 12, not only that shown in FIG. 9, but also any circuit containing a structure as shown in FIGS. 2A, 2B, 2C and 2D can be adopted, as with the terminating device of the first embodiment.

The impedance section 15 has a high impedance in the used frequency band of power line communications and is an inductance element, for example. A range of the high impedance (absolute value) is hundreds and more ohms, but 1 k and more ohms are preferable. The impedance section 15 is inserted between lines for connecting the plug terminals 11a, 11b to the power jack terminals 14a, 14b on the side of the power jack terminals 14a and 14b (on the opposite side to the feeding side of power line) from the connection part of the terminating circuit 12. In the terminating device shown in FIG. 9, the inductance element is inserted in both lines for connecting the plug terminals 11a, 11b to the power jack terminals 14a, 14b, but may be inserted only in either one of them.

If a low-impedance electric apparatus such as a re-charger is connected to the side of the power jack terminals 14a and 14b, the impedance section 15 is inserted, so that the impedance becomes high in the used frequency band of power line communication. Therefore, the effect of the impedance of the electric machine on power line communication can be suppressed. Further, a suppression function of noise occurring from an electric apparatus is also provided, so that the S/N ratio of power line communication can be improved.

The short-circuit switches 16a and 16b short-circuit the impedance section 15 inserted between the plug terminals 11a and 11b and the power jack terminals 14a and 14b. The short-circuit switches 16a and 16b operate in conjunction with the changeover switch 131. That is, if the changeover switch 131 is turned off and the terminating circuit 12 is disconnected from the plug terminals 11a and 11b, the impedance section 15 is short-circuited by the short-circuit switches 16a and 16b.

This state is set if a communication apparatus is connected to the power jack terminals 14a and 14b. Therefore, if the impedance section 15 is short-circuited, the terminating circuit 12 is disconnected from the plug terminals 11a and 11b. Thus, the input impedance can be stabilized, so that the communication apparatus can reduce both attenuation of a communication signal by the impedance section 15 and absorption of a communication signal by inserting the terminating circuit 12. As a result, the communication apparatus can conduct efficient communications.

Thus, the terminating device shown in FIG. 9 enables the power jack terminals 11a and 11b to be used in an efficient state for a communication apparatus and for an electric apparatus.

Figure 10:
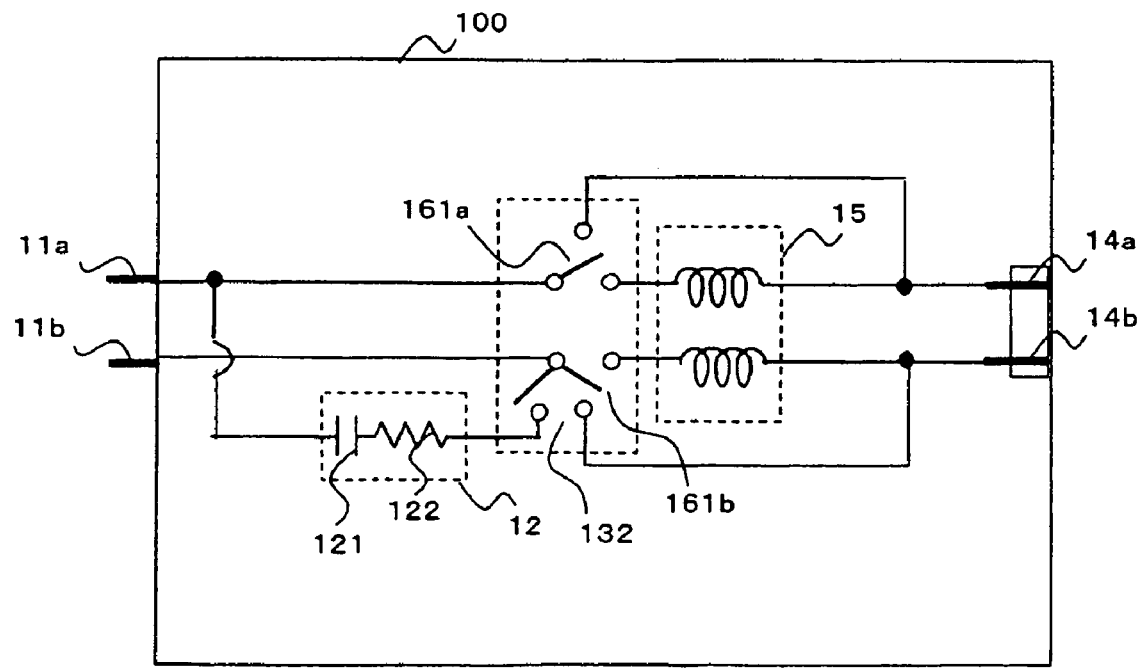
FIG. 10 shows a schematic configuration of another example of the terminating device of the second embodiment.

Referring to FIG. 10, the terminating device has a similar configuration to that of the terminating device in FIG. 9 except that they differ in configurations of changeover switch 132 and short-circuit switches 161a and 161b.

In the terminating device of FIG. 10, the short-circuit switch 161b and the changeover switch 132 are integrated into one structure and are operated in conjunction with each other. That is, if the short-circuit switch 161b is turned counterclockwise, the terminating circuit 12 connects the power jack terminal 11a to the power jack terminal 11b and the impedance section 15 is inserted between the power jack terminal 11b and the power jack terminal 14b. If the short-circuit switch 161b is turned clockwise, the terminating circuit 12 is disconnected and the impedance section 15 is short-circuited. Therefore, the conjunctive operation of the changeover switch 132 and the short-circuit switches 161a and 161b is simplified.

Figure 11:
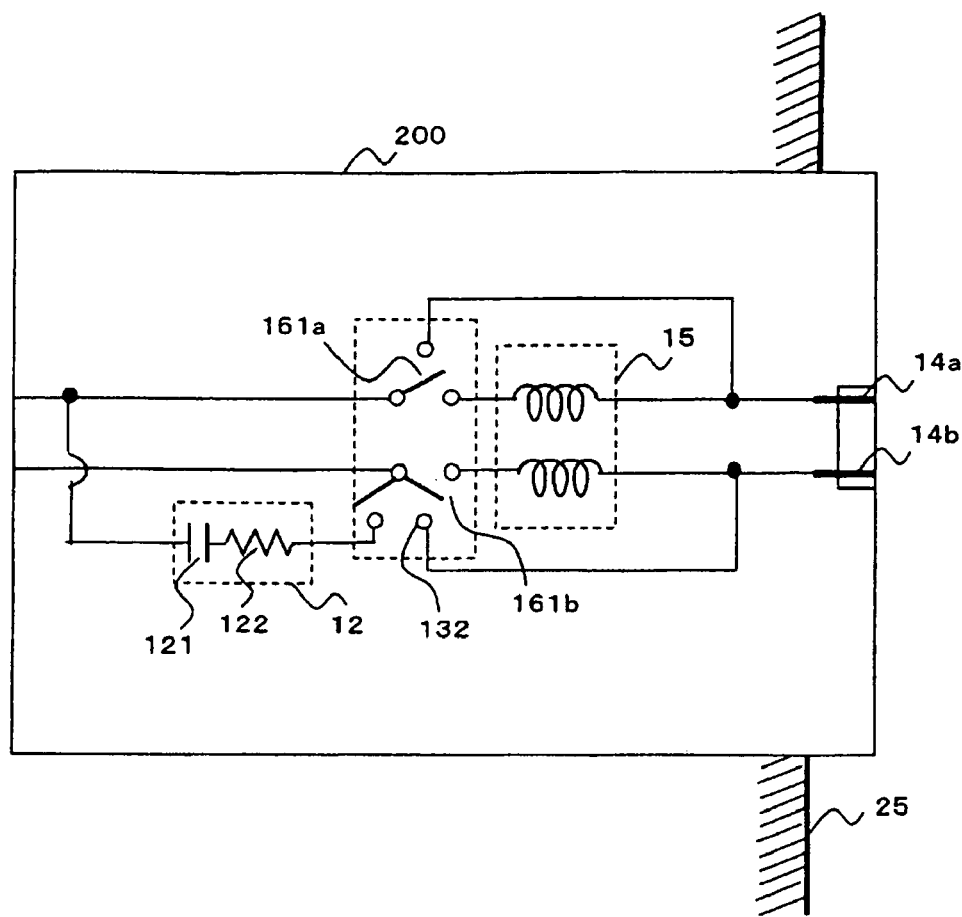
FIG. 11 shows a schematic configuration of another example of the terminating device of the second embodiment.

Referring to FIG. 11, the terminating device has a similar configuration to that of the terminating device of FIG. 10 except that it is in an electrical outlet. The terminating circuit 12, the changeover switch 132, the power jack terminals 14a and 14b, the impedance section 15, and the short-circuit switches 161a and 161b are housed in an outlet case 200 (schematically shown in the figure) attached to a wall 25. A conductor connected to the power jack terminals 11a and 11b in FIG. 10 is connected to a feeding conductor of the electric outlet.

The operation or use method of the terminating device in FIG. 11 is the same as that of the terminating device in FIG. 10. Therefore, the operation will not be described again. In FIG. 11, electric wires making up indoor power line are not shown.

Figure 12:
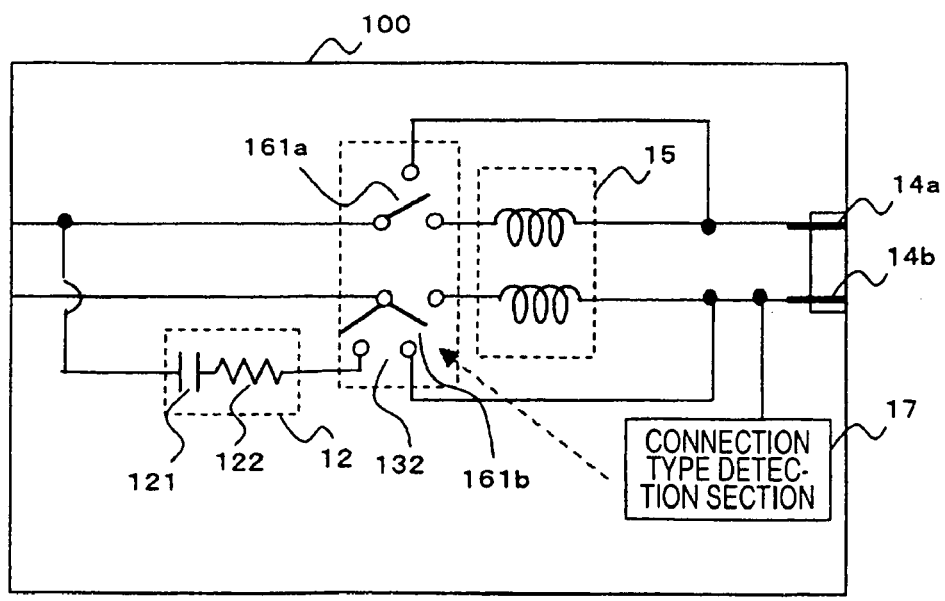
FIG. 12 shows a schematic configuration of another example of the terminating device of the second embodiment.

Referring to FIG. 12, the terminating device has a similar configuration to that of the terminating device in FIG. 10 or the terminating device in FIG. 10 except that a connection type detection section 17 for detecting the type of inserted power plug is provided in the proximity of the power jack terminals 14a and 14b and the changeover switch 132, and the short-circuit switches 161a and 161b are switched in response to the detection result of the connection type detection section 17.

The connection type detection section 17 detects whether the power plug connected to the power jack terminals 14a and 14b is that for a communication apparatus or that for an electric apparatus other than the communication apparatus. This detection can be made mechanically or electrically. To make the detection mechanically, the shape of a power plug of a communication apparatus is made different from that of a usual power plug of an electric apparatus (for example, a projection is provided). Whether or not a communication apparatus is connected is determined by a switch responsive to the shape. To make the detection electrically, the frequency of a signal flowing into the conductor from the power jack terminals 14a and 14b is determined. If a high frequency signal used for communications is detected, it is determined that a communication apparatus is connected.

If it is determined that a communication apparatus is connected, the impedance section 15 is short-circuited by the short-circuit switches 161a and 161b, and the terminating circuit 12 is disconnected by the changeover switch 132.

Third Embodiment

Figure 13:
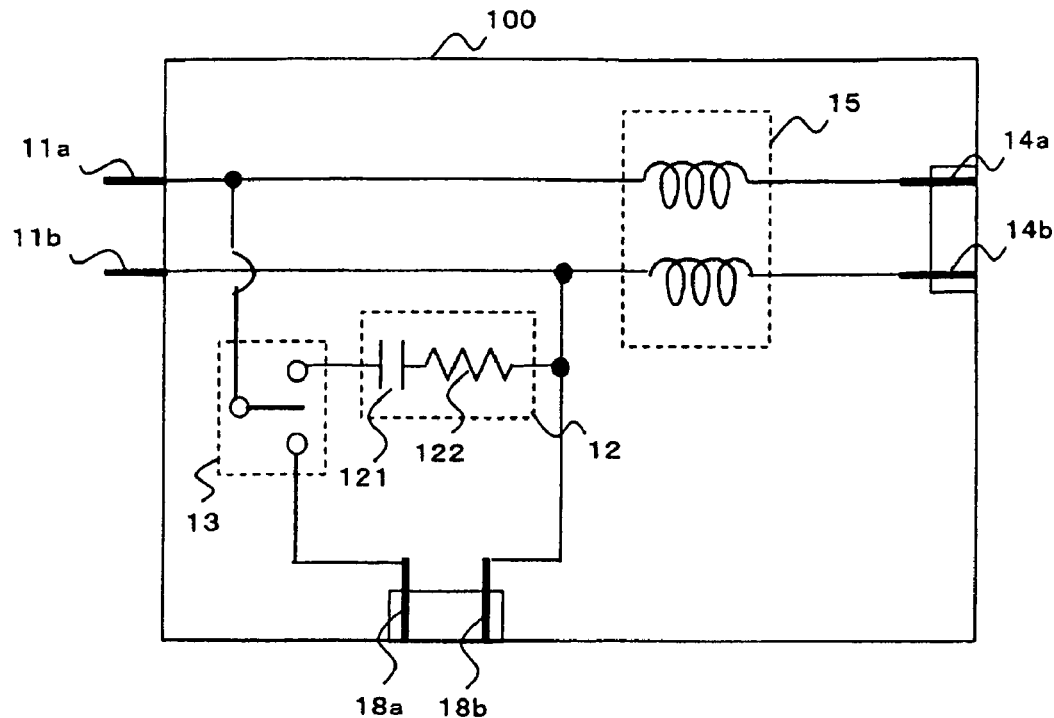
FIG. 13 shows a schematic configuration of an example of a terminating device of a third embodiment.

Referring to FIG. 13, the terminating device is used as an adapter that can be attached to and detached from an electric outlet of an indoor power line like the terminating device in FIG. 1, FIG. 9, and FIG. 10. The terminating device includes plug terminals 11a and 11b, a terminating circuit 12, a changeover switch 13, power jack terminals (first power supply terminals) 14a and 14b, an impedance section 15, and power jack terminals (second power supply terminals) 18a and 18b, and is housed in an adapter case 100 schematically shown.

The plug terminals 11a and 11b are inserted into power jacks 51a and 51b of an electric outlet 50 shown in FIG. 1 and are respectively connected to one of power lines 52. The terminating circuit 12 is connected, through the changeover switch 13, the plug terminal 11a and to the plug terminal 11b.

The changeover switch 13 switches connection of the terminating circuit 12. If the changeover switch 13 connects the terminating circuit 12 between the plug terminals 11a and 11b, connection between the plug terminal 11a and the power jack terminal 18a is disconnected. The power jack terminals 14a and 14b are provided for supplying power to the outside and transmitting a signal to power plugs of a communication apparatus and an electric apparatus.

The terminating circuit 12 has an impedance corresponding to the impedance between indoor power lines in the used frequency band of power line communication. The terminating circuit 12 has a series circuit of an electrostatic capacitive element 121 and a resistance element 122. Therefore, the indoor power line is terminated in the electric outlet in a state in which the terminating circuit 12 connects the plug terminal 11a to the plug terminal 11b. As a result, reflection of a high frequency signal used for power line communication can be decreased.

As the terminating circuit 12, not only that shown in FIG. 13, but also any configuration shown in FIGS. 2A, 2B, 2C and 2D can be adopted, as with the terminating device of the first embodiment.

The impedance section 15 has a high impedance in the used frequency band of power line communication and is an inductance element, for example. The impedance section 15 is inserted between lines for connecting the plug terminals 11a, 11b to the power jack terminals 14a, 14b on the side of the power jack terminals 14a and 14b (on the opposite side to the feeding side of power line) from the connection part of the terminating circuit 12. In the terminating device in FIG. 13, the inductance element is inserted in both lines for connecting the plug terminals 11a and 11b and the power jack terminals 14a and 14b, but may be inserted only in either one of them.

If a low-impedance electric apparatus such as a re-charger is connected to the side of the power jack terminals 14a and 14b, the impedance section 15 is inserted, so that the impedance becomes high in the used frequency band of power line communication. Therefore, the effect of the impedance of the electric machine on power line communication can be suppressed. Further, a suppression function of noise occurring from an electric machine is also provided, so that the S/N ratio of power line communication can be improved.

The power jack terminals 18a and 18b are connected to the plug terminals 11a and 11b through the changeover switch 13. A power plug of a communication apparatus is connected to the power jack terminals 18a and 18b. When a power plug of a communication apparatus is connected (preferably, when power of a communication apparatus is turned on), the changeover switch 13 connects the plug terminal 11a to the power jack terminal 18a.

Thus, the terminating device of FIG. 13 includes the power jack terminals (power supply terminals) having different functions, so that both a communication apparatus and an electric apparatus other than the communication apparatus can be connected. When a communication apparatus is connected and power line communications are conducted, power is also supplied to an electric apparatus through the impedance section 15, so that the effect of the impedance of the electric apparatus on power line communication can be suppressed and S/N of power line communication can also be improved. A communication apparatus is connected to a power line not through the impedance section 15 and the terminating circuit 12 is also disconnected from the plug terminals 11a, 11b, so that attenuation of a communication signal by the impedance section 15 is reduced and absorption of a communication signal by inserting the terminating circuit 12 is reduced. As a result, efficient communications are made possible.

Figure 14:
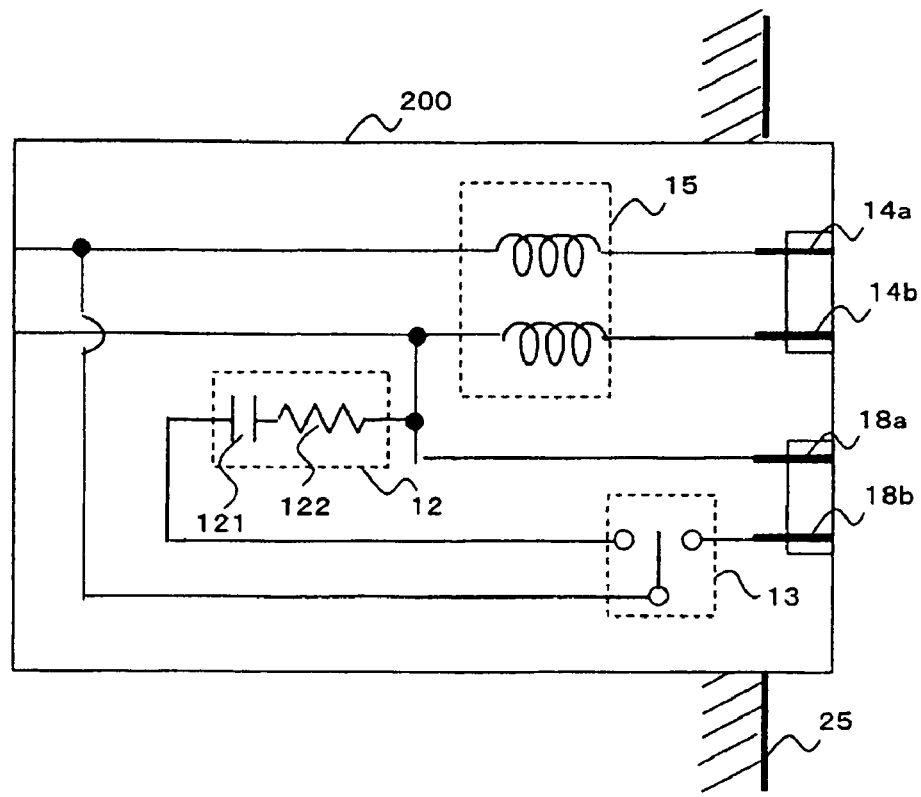
FIG. 14 shows a schematic configuration of another example of the terminating device of the third embodiment.

Referring to FIG. 14, the terminating device has a somewhat similar configuration to that of the terminating device in FIG. 13 except that it is incorporated in an electrical outlet, and the terminating circuit 12, the changeover switch 13, the power jack terminals 14a and 14b, the impedance section 15, and the power jack terminals 18a and 18b are housed in an outlet case 200 (schematically shown in the figure) attached to a wall 25. A conductor connected to the power jack terminals 11a and 11b in FIG. 13 is connected to a feeding conductor of the electric outlet.

The operation or use method of the terminating device in FIG. 14 is the same as that of the terminating device in FIG. 13 and therefore will not be described again.

Figure 15:
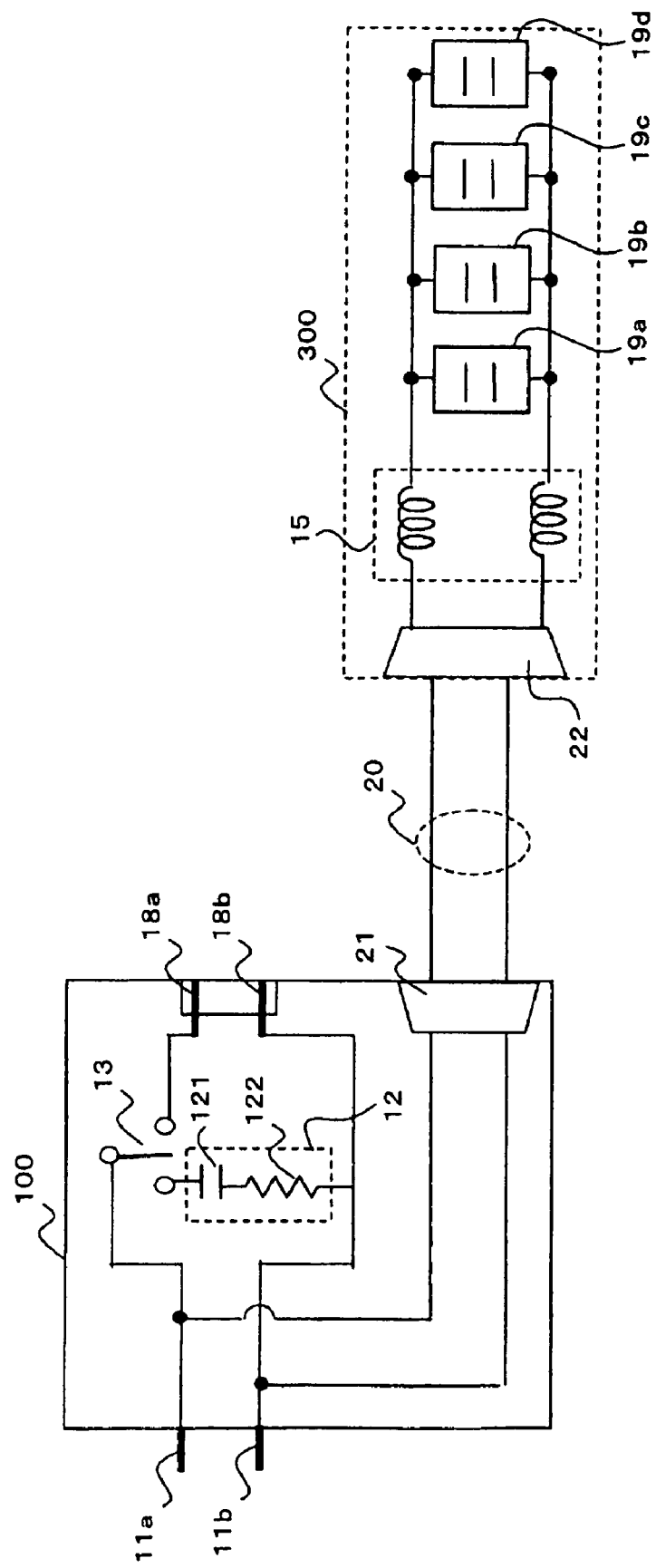
FIG. 15 shows a schematic configuration of another example of the terminating device of the third embodiment.

Referring to FIG. 15, the terminating device is a terminating device wherein the components included in the terminating device in FIG. 13 are housed in two cases. These cases are connected by a power cable.

The terminating device in FIG. 15 includes the plug terminals 11a and 11b, the terminating circuit 12, the changeover switch 13, and the power jack terminals 18a and 18b, which are housed in an adapter case 100 schematically shown in the figure. It also includes the impedance section 15 and outlet connection ports 19a, 19b, 19c, and 19d, which are housed in an outlet tap case 300 schematically shown in the figure. The adapter case 100 is provided with a power cable connection section 21 connected to the plug terminals 11a and 11b, and the outlet tap case 300 is provided with a power cable connection section 22 connected to the outlet connection ports 19a, 19b, 19c, and 19d through the impedance section 15. The power cable connection section 21 is connected, through a power cable 20, to the power cable connection section 22.

The plug terminals 11a and 11b, the terminating circuit 12, the changeover switch 13, and the power jack terminals 18a and 18b are similar to those of the terminating device in FIG. 13, and a communication apparatus is connected to the power jack terminals 18a and 18b. The impedance section 15 is also similar to that of the terminating device in FIG. 13, and if a low-impedance electric machine is connected to the outlet connection port 19a, 19b, 19c, or 19d, as the impedance section 15 is inserted, the impedance becomes high in the used frequency band of power line communications and thus the effect of the impedance of the electric machine on power line communication can be suppressed. Further, a suppression function of noise occurring from an electric machine is also provided, so that the S/N ratio of power line communications can be improved.

As is apparent from the description given above, the operation or use method of the terminating device in FIG. 15 is the same as that of the terminating device in FIG. 13 and therefore will not be described again.

Figure 16:
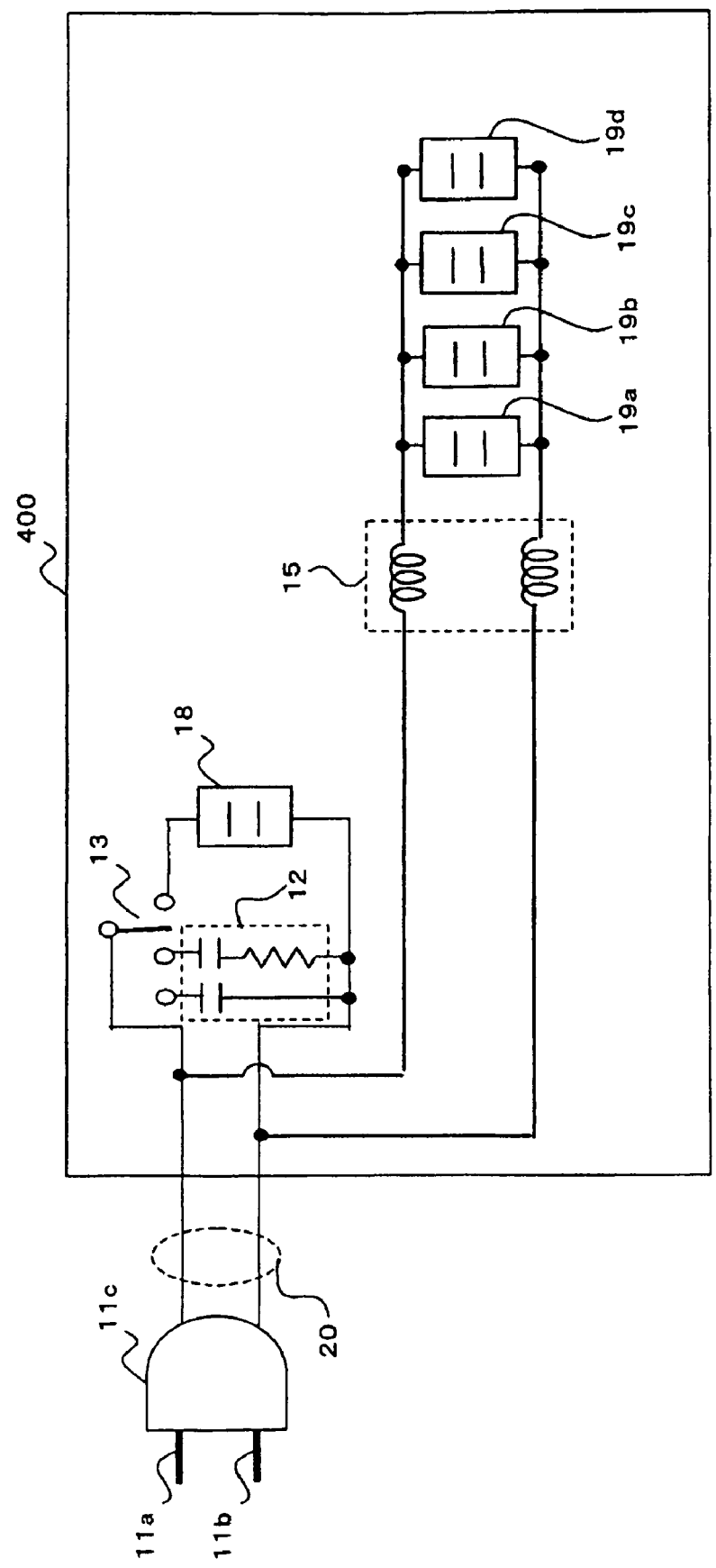
FIG. 16 shows a schematic configuration of another example of the terminating device of the third embodiment.

Referring to FIG. 16, the terminating device is a terminating device wherein the components included in the terminating device in FIG. 13 are housed in two cases. These cases are connected by a power cable.

The terminating device in FIG. 16 includes the terminating circuit 12, the changeover switch 13, the impedance section 15, and the outlet connection ports 19a, 19b, 19c, and 19d, which are housed in an outlet tap case 400 schematically shown in the figure. It is also provided with a plug case 11c for housing the plug terminals 11a and 11b. The plug case 11c is connected, by a power cable 20, to the outlet tap case 400. The power cable 20 is connected to both ends of the terminating circuit 12 through the changeover switch 13 and further is connected to an outlet connection port 18. It is also connected to the outlet connection port 19a, 19b, 19c, 19d through the impedance section 15.

In the terminating device in FIG. 16, as the terminating circuit 12, a configuration for switching a plurality of impedance elements for connection as shown in FIG. 2D is shown, but a similar one to that shown in FIG. 15 may be adopted.

In the terminating device in FIG. 16, like the terminating device in FIG. 15, the outlet connection ports 19a, 19b, 19c, and 19d are used for low-impedance electric machines. The outlet connection port 18 is used for a communication apparatus. As is apparent from the description given above, the operation or use method of the terminating device in FIG. 16 is the same as that of the terminating device in FIG. 13 and therefore will not be discussed again.

Figure 17:
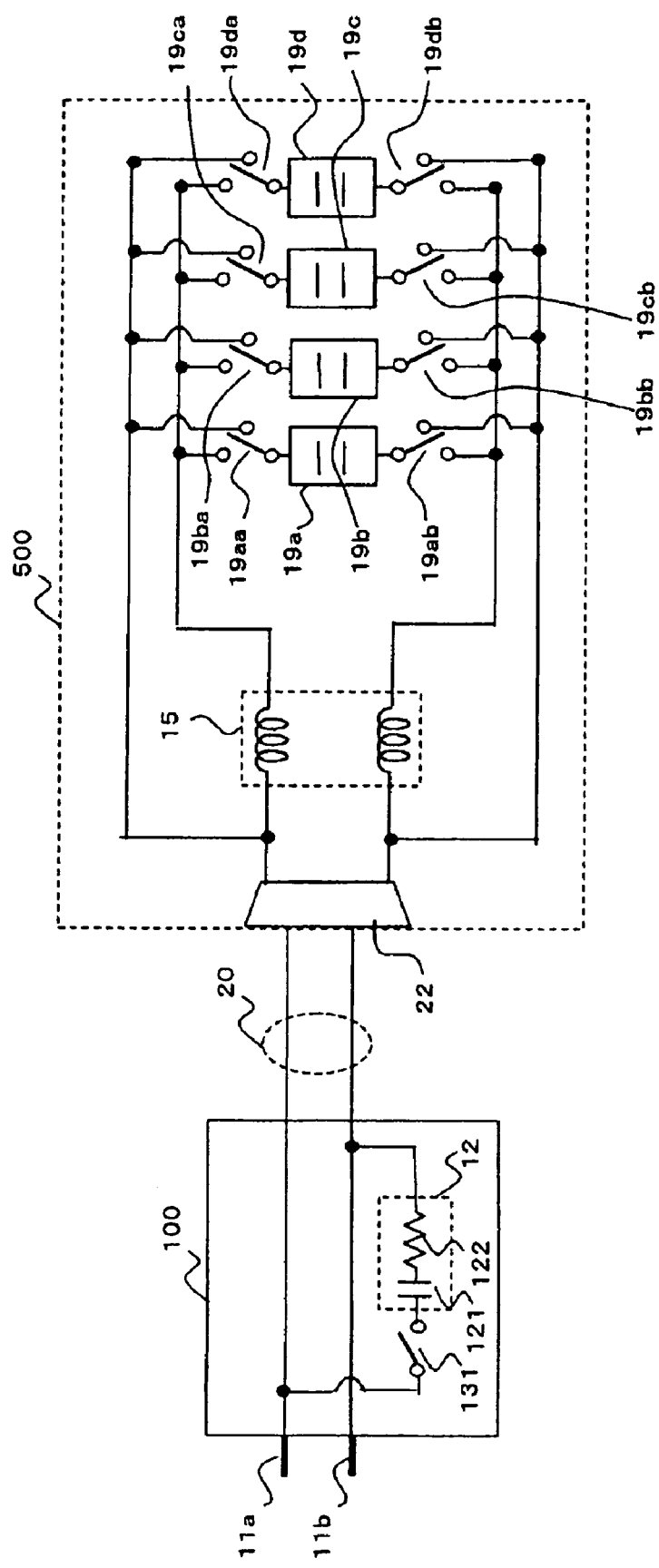
FIG. 17 is a drawing to show the schematic configuration of another example of the terminating device of the third embodiment.

Referring to FIG. 17, the terminating device includes the plug terminals 11a and 11b, the terminating circuit 12, the changeover switch 131, the impedance section 15, the tap connection ports 19a, 19b, 19c, and 19d, and short-circuit switches 19aa, 19ba, 19ca, 19da, 19ab, 19bb, 19cd, and 19db.

The plug terminals 11a and 11b, the terminating circuit 12, and the changeover switch 13 are housed in an adapter case 100 schematically shown in the figure, and the impedance section 15, the tap connection ports 19a, 19b, 19c, and 19d, and the short-circuit switches 19aa, 19ba, 19ca, 19da, 19ab, 19bb, 19cd, and 19db are housed in an outlet tap case 500 schematically shown in the figure. The adapter case 100 and the outlet tap case 500 are connected through a power cable 20. The power cable 20 is connected to the plug terminals 11a and 11b in the adapter case 100 and is connected to the tap connection ports 19a, 19b, 19c, and 19d through the power cable connection section 22, the impedance section 15, and the short-circuit switches 19aa, 19ba, 19ca, 19da, 19ab, 19bb, 19cd, and 19db provided in the outlet tap case 500. It is connected to the tap connection ports 19a, 19b, 19c, and 19d through the short-circuit switches 19aa, 19ba, 19ca, 19da, 19ab, 19bb, 19cd, and 19db directly from the power cable connection section 22.

The short-circuit switches 19aa, 19ba, 19ca, 19da, 19ab, 19bb, 19cd, and 19db switch between insertion and short circuit of the impedance section 15 and the short-circuit switch, corresponding to the tap connection port to which a communication apparatus is connected, switches so as to short-circuit the impedance section 15. When a communication apparatus is connected to any of the tap connection port 19a, 19b, 19c, or 19d, the switch 3 switches so as to disconnect the terminating circuit 12.

As switching is thus performed, the S/N ratio of power line communication can be improved, and efficient communications are made possible regardless of whether a communication apparatus or an electric machine other than the communication apparatus is connected to any of the tap connection port 19a, 19b, 19c, or 19d.

Figure 18:
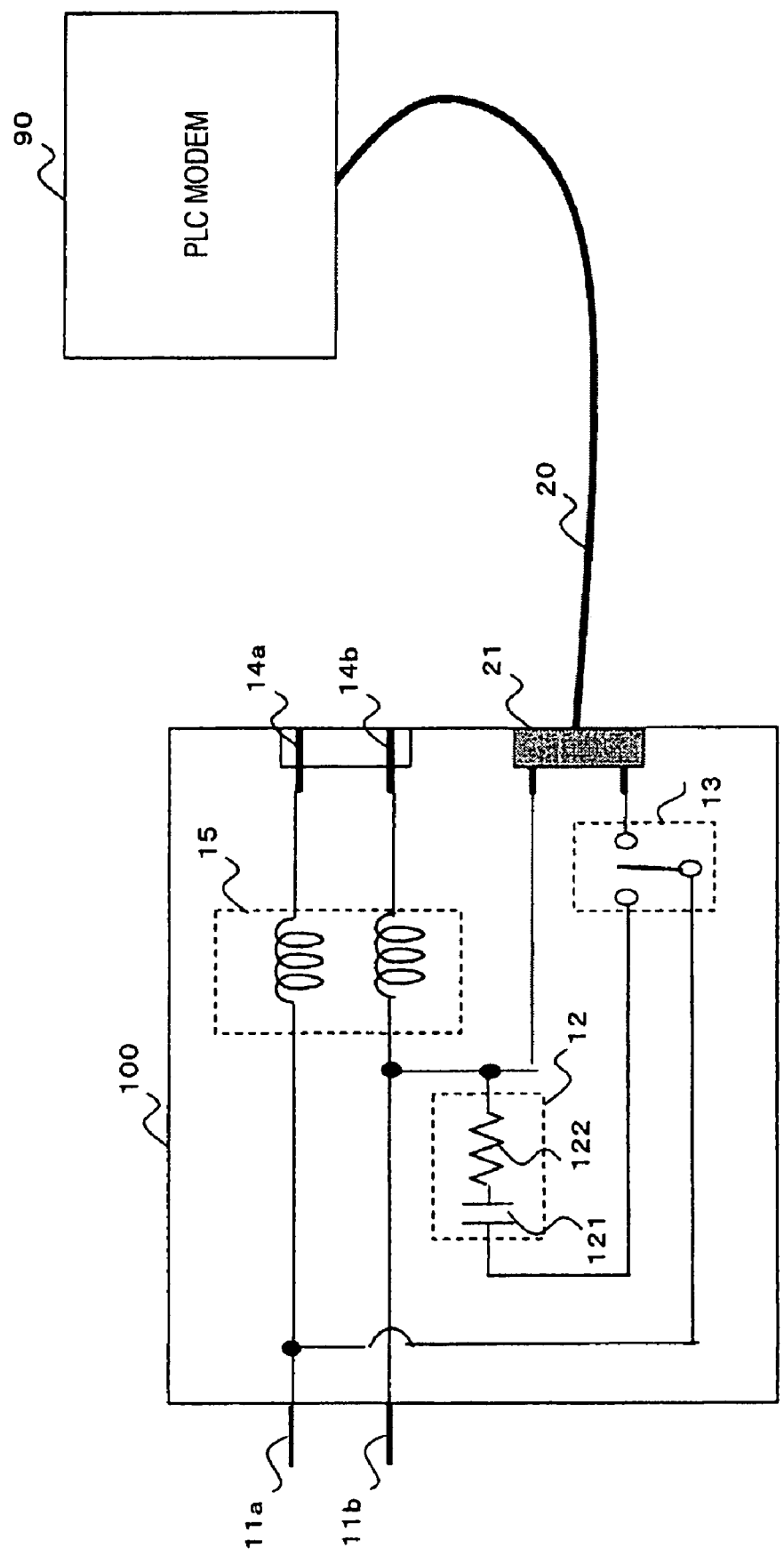
FIG. 18 shows a schematic configuration of another example of the terminating device of the third embodiment.

FIG. 18 shows the schematic configuration of still another example of the terminating device of the third embodiment of the invention. The terminating device in FIG. 18 is configured as an adapter connected to a power cable of a communication apparatus for conducting power line communication.

The terminating device shown in FIG. 18 includes the plug terminals 11a and 11b, the terminating circuit 12, the changeover switch 13, the power jack terminals (first power supply terminals) 14a and 14b, the impedance section 15, and the power cable connection section (second power supply terminals) 21, and is housed in an adapter case 100 schematically shown. A power cable 20 of a PLC modem 90 is connected to the power cable connection section 21 and is connected to the plug terminals 11a and 11b through switches 13a and 13b.

As is apparent from FIG. 18, the terminating device in FIG. 18 can operate and be used as the power cable 20 of the PLC modem 90 is connected to the power jack terminals 18a and 18b in the terminating device in FIG. 13. That is, an electric machine other than a communication apparatus is connected to the power jack terminals 14a and 14b, and when the PLC modem 90 is used, the changeover switch 13 is connected to the power cable connection section 21 and the terminating circuit 12 is disconnected.

Figure 19:
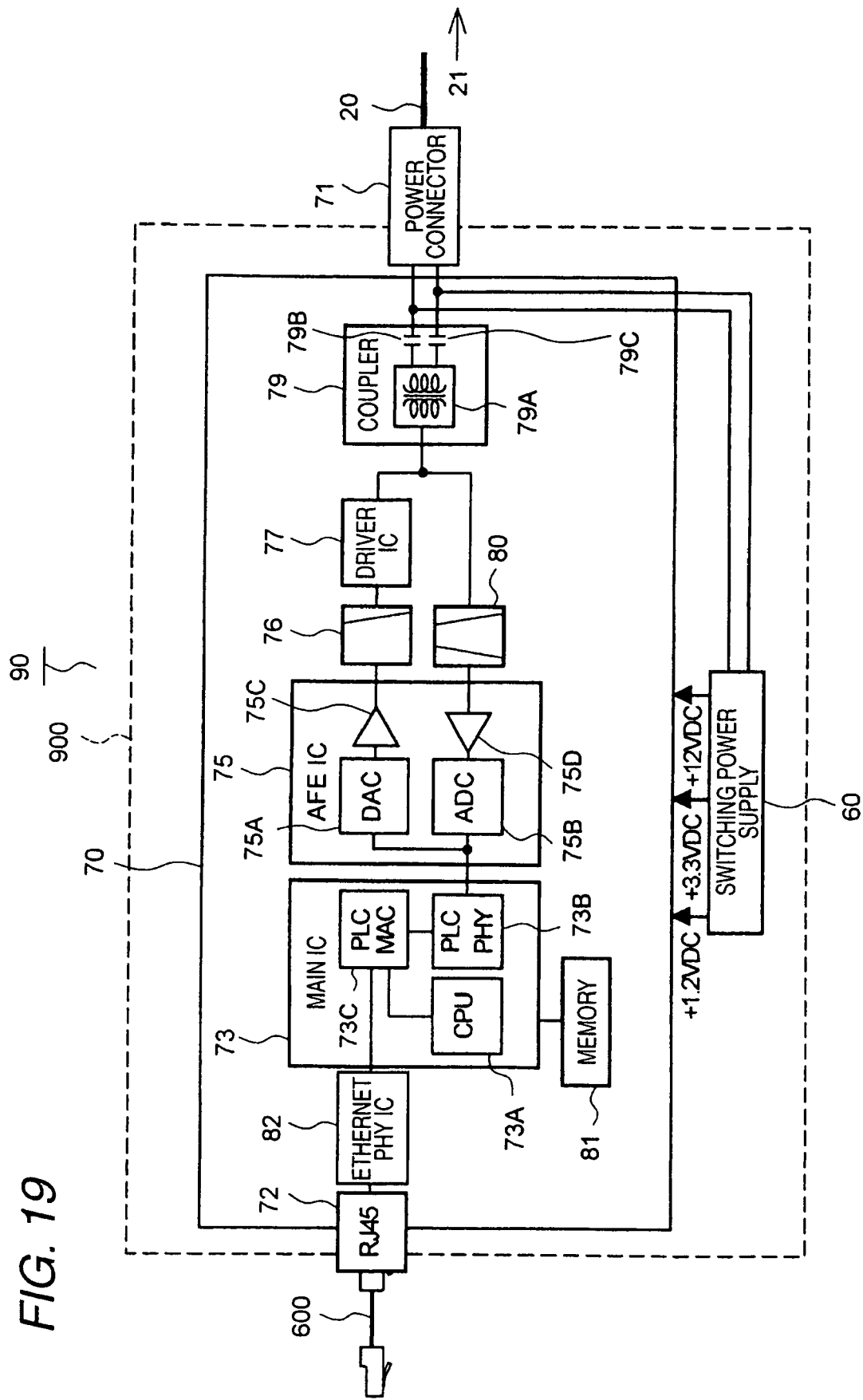
FIG. 19 is a block diagram which shows a hardware example of the PLC modem of the third embodiment.

FIG. 19 is a block diagram to show a hardware example of the PLC modem in FIG. 13 and FIG. 18. The PLC modem 90 has a case 900 (dashed line) and the case 900 is provided with a power connector 71 and a LAN (local area network) modular jack 72 of RJ45, etc. A power cable 20 as an example of a power line is connected to the power connector 71. A LAN cable 600 is connected to the modular jack 72. The PLC modem 90 contains a switching power supply 60 and a circuit module 70. The switching power supply 60 supplies various (for example, +1.2 V, +3.3 V, and +12 V) voltages to the circuit module 70. The circuit module 70 is provided with a main IC 73, an AFC IC (Analog Front End IC) 75, a low-pass filter 76, a driver IC 77, a coupler 79, a band-pass filter 80, memory 81, and Ethernet PHY IC 82.

The main IC 73 is made up of a CPU (Central Processing Unit) 73A, a PLC MAC (Power Line Communication Media Access Control layer) block 73C, and a PLC PHY (Power Line Communication Physical layer) block 73B. A 32-bit RISC (reduced instruction set computer) processor is installed in the CPU 73A. The PLC MAC block 73C manages a MAC layer of a transmission signal and the PLC PHY block 73B manages a PHY layer of a transmission signal. The AFE IC 75 is made up of a DA converter (DAC) 75A, an AD converter (ADC) 75B, and variable amplifiers (VGA) 75C and 75D. The coupler 79 is made up of a coil transformer 79A and coupling capacitors 79B and 79C.

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art. For example, one or more elements of each embodiment may be omitted or incorporated into the other embodiments.

The foregoing description of implementations and embodiments of the invention have been presented for purposes of non-limiting illustration and description. Although the present invention has been described herein with reference to particular structures, materials and embodiments, the present invention is not intended to be limited to the particular features and details disclosed herein. Rather, the present invention extends to all functionally equivalent structures, methods and uses, such as are within the scope of the appended claims. The descriptions provided herein are not exhaustive and do not limit the invention to the precise forms disclosed. The foregoing embodiment examples have been provided merely for purposes of explanation and are in no way to be construed as limiting the scope of the present invention. The words that have been used herein are words of description and illustration, rather than words of limitation. The present teachings can readily be realized and applied to other types of apparatuses. Further, modifications and variations, within the purview, scope and spirit of the appended claims and their equivalents, as presently stated and as amended hereafter, are possible in light of the above teachings or may be acquired from practicing the invention. Furthermore, although elements of the invention may be described or claimed in the singular, the plural is contemplated unless limitation to the singular is explicitly stated Alternative structures discussed for the purpose of highlighting the invention's advantages do not constitute prior art unless expressly so identified. No one or more features of the present invention are necessary or critical unless otherwise specified.

The present application is based on Japanese Patent Application No. 2005-311402 filed on Oct. 26, 2005, which is incorporated herein by reference.

INDUSTRIAL APPLICABILITY

The invention is useful as a terminating device, etc., for making it possible to conduct power line communication with degradation of the communication quality suppressed without decreasing the communication efficiency.

The invention claimed is:

1. A terminating device for being installed at a termination of a power line usable for power line communication, the terminating device comprising:
   first and second terminals for being connected to the power line;
   a terminating circuit that has a predetermined impedance and that is connected to said first terminal; and
   a switch that is connected to said second terminal in series with said first terminal, said terminating circuit and said second terminal and that switches connection between said first and second terminals.

2. The terminating device according to claim 1, wherein said terminating circuit includes a resistance element.

3. The terminating device according to claim 2, wherein the resistance element has a changeable resistance.

4. The terminating device according to claim 2, wherein said terminating circuit further includes an electrostatic capacitative element.

5. The terminating device according to claim 1, wherein the predetermined impedance of said terminating circuit is changeable.

6. The terminating device according to claim 5, wherein said terminating circuit includes a plurality of circuit elements and selectively employs the plurality of circuit elements.

7. The terminating device according to claim 1, wherein the power line includes an electric outlet including a feeding conductor and said first and second terminals are capable of being connected to the feeding conductor.

8. The terminating device according to claim 1, further comprising:
   a power plug that includes said first and second terminals to be inserted into an electric outlet of the power line.

9. The terminating device according to claim 8 further comprising:
   at least one power jack,
   wherein said power jack is connected to said power plug at least when the connection between said first and second terminals is caused to be open by said switch.

10. The terminating device according to claim 9 further comprising:
    an impedance section that is disposed between said power jack and said power plug and that has high impedance in the used frequency band of power line communication.

11. The terminating device according to claim 10 further comprising:
    a short-circuit switch that short-circuits said impedance section,
    wherein the short-circuit switch operates in association with said switch and short-circuits the impedance section when the connection between said first and second terminals is caused to be open by said switch.

12. The terminating device according to claim 9, wherein said power jack is capable of being connected to a power cable of a communication apparatus for performing power line communication.

13. The terminating device according to claim 12, wherein said switch switches the connection between said first and second terminals in accordance with an operation status of the communication apparatus.

14. The terminating device according to claim 12, wherein said switch switches the connection between said first and second terminals in accordance with a status of connection between the communication apparatus and the terminating device.

15. The terminating device according to claim 1, wherein the switch includes a moveable member for switching the connection between said first and second terminals.

16. The terminating device according to claim 15, wherein the moveable member is a moving conductor.

17. The terminating device according to claim 16, wherein the moving conductor is rotatable with one end as a supporting point.

18. The terminating device according to claim 16, wherein the moving conductor is rotatable with the center as a supporting point.

19. The terminating device according to claim 1, wherein said switch includes a photoelectric switch for switching the connection between said first and second terminals.

* * * * *